US008287772B2

(12) United States Patent
Le et al.

(10) Patent No.: US 8,287,772 B2
(45) Date of Patent: Oct. 16, 2012

(54) LOW ENERGY MILLING METHOD, LOW CRYSTALLINITY ALLOY, AND NEGATIVE ELECTRODE COMPOSITION

(75) Inventors: Dinh B. Le, St. Paul, MN (US); Mark N. Obrovac, St. Paul, MN (US); Robert Y. Kube, Apple Valley, MN (US); James R. Landucci, St. Paul, MN (US)

(73) Assignee: 3M Innovative Properties Company, St. Paul, MN (US)

( * ) Notice: Subject to any disclaimer, the term of this patent is extended or adjusted under 35 U.S.C. 154(b) by 440 days.

(21) Appl. No.: 12/465,852

(22) Filed: May 14, 2009

(65) Prior Publication Data

US 2010/0288982 A1 Nov. 18, 2010

(51) Int. Cl.
*H01B 1/02* (2006.01)
(52) U.S. Cl. .............. 252/520.1; 252/512; 252/513; 252/520.2; 75/392; 424/489; 429/218.1; 429/221; 429/222; 429/231.5; 429/231.8
(58) Field of Classification Search .............. 252/513, 252/512, 520.1, 520.2; 75/392; 419/61; 428/323; 429/129, 221, 218.1, 222, 231.5, 429/231.8; 424/489
See application file for complete search history.

(56) References Cited

U.S. PATENT DOCUMENTS

| | | | |
|---|---|---|---|
| 4,048,395 A | 9/1977 | Lai | |
| 4,627,959 A * | 12/1986 | Gilman et al. ............. | 419/61 |
| 6,203,944 B1 | 3/2001 | Turner et al. | |
| 6,436,578 B2 | 8/2002 | Turner et al. | |
| 6,495,291 B1 * | 12/2002 | Kohno et al. ............. | 429/231.8 |
| 6,679,925 B1 | 1/2004 | Tanizaki et al. | |
| 6,730,434 B1 | 5/2004 | Kawakami et al. | |
| 6,949,312 B1 | 9/2005 | Kawakami et al. | |
| 7,169,328 B2 | 1/2007 | Miller et al. | |
| 7,229,717 B2 | 6/2007 | Yamaguchi et al. | |
| 7,378,041 B2 | 5/2008 | Asao et al. | |
| 2003/0068558 A1 | 4/2003 | Sato et al. | |
| 2003/0134198 A1 | 7/2003 | Sawa et al. | |
| 2004/0062990 A1 | 4/2004 | Shimamura et al. | |
| 2004/0091775 A1 | 5/2004 | Nishino et al. | |
| 2005/0031957 A1 | 2/2005 | Christensen et al. | |
| 2006/0040182 A1 | 2/2006 | Kawakami et al. | |
| 2006/0046144 A1 | 3/2006 | Obrovac | |
| 2006/0068292 A1 | 3/2006 | Mizutani et al. | |
| 2006/0172196 A1 | 8/2006 | Fukunaga | |
| 2007/0020521 A1 | 1/2007 | Obrovac et al. | |
| 2007/0020522 A1 | 1/2007 | Obrovac et al. | |
| 2007/0020528 A1 | 1/2007 | Obrovac et al. | |
| 2007/0098803 A1 * | 5/2007 | Dobbs et al. ............. | 424/489 |
| 2007/0111100 A1 | 5/2007 | Bito et al. | |
| 2007/0122708 A1 | 5/2007 | Shimamura et al. | |
| 2007/0128517 A1 | 6/2007 | Christensen et al. | |
| 2007/0148544 A1 * | 6/2007 | Le ............. | 429/218.1 |
| 2008/0081260 A1 | 4/2008 | Yamamoto et al. | |
| 2008/0248386 A1 | 10/2008 | Obrovac et al. | |
| 2009/0035661 A1 * | 2/2009 | Swoyer et al. ............. | 429/231.5 |
| 2009/0081549 A1 * | 3/2009 | Liaw et al. ............. | 429/222 |
| 2010/0189995 A1 * | 7/2010 | Adams et al. ............. | 428/323 |
| 2010/0288982 A1 | 11/2010 | Le et al. | |

FOREIGN PATENT DOCUMENTS

| | | |
|---|---|---|
| JP | 5-159780 | 6/1993 |
| JP | 10-223221 | 8/1998 |
| JP | 10-312804 | 11/1998 |
| JP | 2000-119708 | 4/2000 |
| JP | 2000-311681 | 11/2000 |
| JP | 2001-118575 | 4/2001 |
| JP | 2002-042805 | 2/2002 |
| JP | 2004-071391 | 3/2004 |
| JP | 2005-078999 | 3/2005 |
| JP | 2005-347076 | 12/2005 |
| JP | 2006-236887 | 9/2006 |
| JP | 2006-344403 | 12/2006 |
| JP | 2007-172858 | 7/2007 |
| WO | WO 2009-010297 | * 1/2009 |

OTHER PUBLICATIONS

Hassoun et al., "An electrochemical investigation of a Sn-Co-C ternary alloy as a negative electrode in Li-ion batteries", *Journal of Power Sources*, 171, (2007), pp. 928-931.
Calka et al., "The Effect of Milling Condition on the Formation of Nanostructures: Synthesis of Vanadium Carbides", *Scripta Metallurgica et Materialia*, vol. 26, pp. 249-253 (1992).
Liu et al., "Different Pathways of Phase Transition in a V-Si System Driven by Mechanical Alloying", *Materials Research Bulletin*, vol. 33, No. 4, pp. 539-545 (1998).
Le, U.S. Appl. No. 12/465,865 entitled "Method of Making an Alloy", filed May 14, 2009.
Hassoun et al., "Ternary Sn-Co-C Li-Ion Battery Electrode Material Prepared by High Energy Ball Milling," *Electrochem. Comm.*, 9, (2007), pp. 2075-2081.

* cited by examiner

*Primary Examiner* — Khanh Tuan Nguyen
(74) *Attorney, Agent, or Firm* — Bradford B. Wright; Yen Tong Florczak

(57) ABSTRACT

A method of making nanostructured alloy particles includes milling a millbase in a pebble mill containing milling media. The millbase comprises: (i) silicon, and (ii) at least one of carbon or a transition metal, and wherein the nanostructured alloy particles are substantially free of crystalline domains greater than 50 nanometers in size. A method of making a negative electrode composition for a lithium ion battery including the nanostructured alloy particles is also disclosed.

21 Claims, No Drawings

LOW ENERGY MILLING METHOD, LOW CRYSTALLINITY ALLOY, AND NEGATIVE ELECTRODE COMPOSITION

STATEMENT REGARDING FEDERALLY SPONSORED RESEARCH OR DEVELOPMENT

This invention was made with Government support under contract number DE-EE0000650 awarded by the Department of Energy. The Government has certain rights in this invention.

TECHNICAL FIELD

The present disclosure broadly relates to powder milling techniques, to alloys formed thereby, and to the use of such alloys as electrode compositions for lithium ion batteries.

BACKGROUND

A pebble mill is a type of ball mill characterized by a cylindrical or conical vessel rotated on a horizontal axis. Pebble mills can have steel inner walls, but often are lined with ceramic, rubber, plastic or other materials. Pebble mills are used in conjunction with milling media that are typically steel or ceramic, although other milling media can be used.

Pebble mills can be in the form of cylindrical jars which are loaded from a sealable port on one end of the jar. During the milling process, smaller pebble mills are often placed on a powered set of rollers. Larger pebble mills often consist of a cylindrical vessel, mounted horizontally on pins along its longitudinal axis and driven by a shaft, gears, or belts. Such pebble mills commonly further comprise a fixed shroud which encloses the milling vessel. The shroud allows for discharging of the mill while the vessel is being rotated. Pebble mill vessels sometimes have double walls to allow for water cooling of the milling vessel, lifters to prevent the slippage of the media on the interior walls of the vessel, and/or ports to allow gas purging during operation.

Pebble mills are commonly used to grind powders to fine particle sizes or to disperse powders or pigments in solvents. In conventional dry grinding operations pebble mills are typically filled to half of their volume with a mixture of the milling media and the powder to be ground (commonly termed as the millbase). The milling media is commonly of three types: spherical, cylindrical or irregular. In the case of spherical milling media, the volume ratio of the milling media to the millbase is typically 30:20. The rotational speed of the vessel is set so that the media inside the vessel form a continuous cascade, with the cascade angle being in a range of 45-60° with respect to horizontal. These conditions are widely used as they are optimal for the efficient milling of powders. At higher rotational speeds the media tend to be launched into the air inside the vessel forming a cataract. At even higher rotational speeds the media can become pinned to the sides of the vessel by centrifugal force. The theoretical rotational speed in revolutions per minute (rpm) at which the media becomes pinned to the vessel's side is called the critical speed of the mill and is given by:

$$rpm_{critical} = 54.2/R^{0.5}$$

where R is the inside diameter of the milling vessel expressed in feet.

SUMMARY

In one aspect, the present disclosure provides a method of making nanostructured alloy particles, the method comprising: milling a millbase, in a pebble mill containing milling media to provide the nanostructured alloy particles, wherein the millbase comprises: (i) silicon, and (ii) at least one of carbon or a transition metal, and wherein the nanostructured alloy particles are substantially free of crystalline domains greater than 50 nanometers in size.

In yet another aspect, the present disclosure provides a method of making a negative electrode composition for a lithium ion battery, the method comprising:
  (a) making nanostructured alloy particles by a method comprising milling, in a pebble mill containing milling media, a millbase comprising:
    (i) silicon; and
    (ii) at least one of carbon or a transition metal, wherein the nanostructured alloy particles are substantially free of crystalline domains greater than 50 nanometers in size; and
  (b) dispersing the nanostructured alloy particles in a polymeric binder to provide the negative electrode composition.

In some embodiments, a volume ratio of the milling media to the millbase is greater than 1.5:1. In some embodiments, a volume ratio of the milling media to the millbase is greater than 5:1. In some embodiments, the nanostructured alloy particles are amorphous. In some embodiments, a volume ratio of the pebble mill to the milling media and the millbase combined is 2:1 or less. In some embodiments, the pebble mill has a theoretical critical speed, and wherein the pebble mill has a rotational speed in a range of from 50 to 120 percent of the theoretical critical speed. In some embodiments, the pebble mill has a maximum impact energy in a range of from 0.01 to 0.3 joules. In some embodiments, the pebble mill has a containment wall having a temperature, wherein the temperature is maintained at or below 100 degrees Celsius. In some embodiments, the pebble mill has a steel inner wall. In some embodiments, the pebble mill has a ceramic or ceramic-lined containment wall.

In some embodiments, the nanostructured alloy particles comprise silicon, tin, and a transition metal. In some embodiments, the millbase comprises ferrosilicon. In some embodiments, (ii) comprises carbon. In some embodiments, the pebble mill further contains a milling aid comprising a saturated higher fatty acid or a salt thereof. In some embodiments, the milling aid comprises stearic acid. In some embodiments, the nanostructured alloy particles are adapted for use as an active material in a negative electrode composition in a lithium ion battery. In some embodiments, the nanostructured alloy particles comprise at least 10, 20, 30, 40, 50, 60, or even 70 percent by weight of silicon, or more.

Advantageously, Applicants have found that milling methods according to the present disclosure produce nanostructured alloy particles that are substantially free of crystalline regions having a size in excess of 50 nanometers. For example, the nanostructured alloy particles may have less than 1 percent by weight, less than 0.5 percent by weight, or even less than 0.1 percent by weight of crystalline regions having a size in excess of 50 nanometers.

Moreover, the milling methods are readily scalable to commercial production levels. In contrast, currently used technologies (e.g., high impact mills) are prone to formation of larger crystalline regions and/or are problematic to scale up to produce commercially useful quantities of nanostructured alloy particles. For use in negative electrodes of lithium ion batteries, the nanostructured alloy particles should be amorphous or at least be substantially free of crystalline regions having a size in excess of 50 nanometers as materials having such regions are generally not suitable for repeated lithiation/delithiation.

In some embodiments, Applicants have also found that using a pebble mill having a ceramic-lined inner wall instead of a corresponding metal-lined pebble mill essentially eliminates problems of caking that reduce efficiency of the metal-lined pebble mills.

As used herein:

the term "alloy" refers to a substance having one or more metallic phases, and comprising two or more metallic elements;

the term "metallic compound" refers to a compound that includes at least one metallic element;

the term "alloying" refers to a process that forms an alloy;

the term "amorphous" as applied to a material means that the material lacks the long range atomic order characteristic of crystalline material, as observed by x-ray diffraction;

the term "delithiation" refers to a process for removing lithium from an electrode material;

the term "electrochemically active" refers to a material that reversibly reacts with lithium under conditions typically encountered during charging and discharging in a lithium-ion battery;

the term "metallic element" refers to all elemental metals (including tin), silicon, and carbon;

the term "mill" refers to a device for alloying, grinding, milling, pulverizing, or otherwise breaking down a material into small particles (examples include pebble mills, jet mills, ball mills, rod mills and attritor mills);

the term "milling" refers to a process of placing a material in a mill and operating the mill to perform alloying, or to grind, pulverize, or break down the material into small or smaller particles; and the term "nanostructured alloy" refers to an alloy that is substantially free of crystalline domains greater than 50 nanometers in size;

the term "negative electrode" refers to an electrode of a lithium ion battery (often called an anode) where electrochemical oxidation and delithiation occurs during a discharging process; and the phrase "positive electrode" refers to an electrode (often called a cathode) where electrochemical reduction and lithiation occurs during a discharging process.

DETAILED DESCRIPTION

Pebble mills are well known in the powder processing art. They are widely available commercially from a multitude of manufacturers. Whether generally cylindrical, generally conical, or some other shape, useful pebble mills may be relatively small (e.g., having a maximum inside diameter of 6 inches (15 cm) or less) or they may have a maximum larger inner diameter (e.g., up to 6 feet (2 m) or more). Advantageously, the methods of the present disclosure are well-suited for the entire range of sizes, thereby making it useful for commercial-scale production. The pebble mills can, for example, have steel walls or be lined with ceramic material. As is common in the art, the pebble mill may be of the double wall type, wherein a cooling medium (e.g., water) can be circulated between the walls, thereby regulating the temperature of the inner wall. For example, the temperature of the inner (containment) wall may be maintained at or below 100° C.

In normal operation, pebble mills typically have a theoretical critical speed at which milling media contained in the pebble mill are theoretically pinned against the wall by centrifugal force and milling efficiency declines markedly. However, in at least some cases Applicants have unexpectedly found that milling speeds near or above the theoretical critical speed can result in nanostructured alloys. While experimental condition will vary somewhat depending on the pebble mill design, it is found that rotational speeds in a range of from 50 to 120 percent of the critical speed are typically suitable for producing nanostructured alloy particles that are amorphous or at least substantially free of crystalline domains greater than 50 nanometers in size.

Under these conditions, the maximum impact energy of the milling media contained in the pebble mill is typically insufficient to induce significant crystallization of the nanostructured alloy particles. For example, the maximum impact energy, whether theoretical and/or actual, may typically be in a range of from 0.01 to 0.3 joules during the milling of the millbase without significant crystallization of the nanostructured alloy particles.

Useful milling media are readily available from commercial sources and include steel, glass, and ceramic media, however other milling media may also be used. The milling media may have the form of balls, rods, irregular shaped bodies, and combinations thereof. Examples of milling media include chrome steel balls, ceramic balls, ceramic cylinders, long steel bars, short steel bars, and combinations thereof.

In some embodiments, the millbase includes multiple types of particles having different compositions. For example, the millbase may include silicon particles, tin particles, carbon particles, and transition metal particles. In some embodiments, the millbase comprises one or more alloys of the silicon particles, tin particles, carbon particles, and/or transition metal particles. Examples of alloys include ferrosilicon and alloys of one or more of transition metals (including rare earth metals) such as, e.g., Fe, Ti, Y, V, Cu, Zr, Zn, Co, Mn, Mo, and Ni; for example, misch metal.

Whatever the composition of the millbase, if intending to use the nanostructured alloy particles in a negative electrode composition in a lithium ion battery, the proportions should generally be adjusted such that the resultant negative electrode composition is electrochemically active, as is well known in the battery art.

The millbase may further comprise a milling aid. Examples of milling aids include one or more saturated higher fatty acids (e.g., stearic acid, lauric acid, and palmitic acid) and salts thereof, hydrocarbons such as mineral oil, dodecane, polyethylene powder. In general the amount of any optional milling aid is less than 5 percent by weight, typically less than 1 percent by weight of the millbase.

If desired, solid millbase ingredients may be obtained as powder or reduced to a powder from ingot or chunks prior to placing them in the pebble mill. In some cases, ingot or chunk may be used directly in the pebble mill, in which case the ingots or chunks are broken up during the milling process. Pure elements may be used as components of the millbase, or one or more of them may be substituted by preformed alloys; for example, as generally described in U.S. Pat. Appl. Publ. No. 2010-0288077 A1.

Any relative amount of the millbase and milling media may be used, but typically a volume ratio of the milling media to the millbase of greater than 1.5:1, or even greater than 5:1, provides for relatively high productivity and quality.

Any volume ratio of the enclosed volume of the pebble mill to the milling media and the millbase may be used. Typically, nanostructured alloy particles that are substantially free of crystalline regions having a size in excess of 50 nanometers are obtained when the enclosed volume of the pebble mill divided by the milling media and the millbase combined is in a range of 2:1 or less.

In general, milling should be conducted in a controlled oxygen environment; for example, in an inert gas (e.g., nitrogen, helium, and/or argon) environment.

Exemplary nanostructured alloys include silicon alloys wherein the active material comprises from about 50 to about 85 mole percent silicon, from about 5 to about 25 mole percent iron, from about 0 to about 12 mole percent titanium, and from about 0 to about 12 mole percent carbon. More examples of useful silicon alloys include compositions that include silicon, copper, and silver or silver alloy such as those discussed in U.S. Pat. Appl. Publ. No. 2006/0046144 A1 (Obrovac et al); multiphase, silicon-containing electrodes such as those discussed in U.S. Pat. No. 7,498,100 (Christensen et al); silicon alloys that contain tin, indium and a lanthanide, actinide element or yttrium such as those described in U.S. Pat. Nos. 7,851,085 (Obrovac et al.), 7,871,727 (Obrovac et al.); and amorphous alloys having a high silicon content such as those discussed in U.S. Pat. No 7,732,095 (Christensen et al); and silicon-tin-metal-carbide alloys such as those described in U.S. Pat. No. 7,906,238 (Le).

Nanostructured alloy particles prepared according to the present disclosure can be dispersed in a polymeric binder to form a negative electrode composition and/or a positive electrode composition using techniques well known in the battery art. Exemplary polymeric binders include oxo-acids and their salts, such as sodium carboxymethylcellulose, polyacrylic acid and lithium polyacrylate. Other examples of polymeric binders include polyolefins such as those prepared from ethylene, propylene, or butylene monomers; fluorinated polyolefins such as those prepared from vinylidene fluoride monomers; perfluorinated polyolefins such as those prepared from hexafluoropropylene monomer; perfluorinated poly(alkyl vinyl ethers); perfluorinated poly(alkoxy vinyl ethers); or combinations thereof. Other polymeric binders include polyimides such as the aromatic, aliphatic or cycloaliphatic polyimides and polyacrylates.

The polymeric binder may be crosslinked. Crosslinking can improve the mechanical properties of the binders and can improve the contact between the active material composition and any electrically conductive diluent that can be present.

Electrode compositions can contain additives such as will be familiar to those skilled in the art. For example, the electrode composition can include an electrically conductive diluent to facilitate electron transfer from the powdered material to a current collector. Electrically conductive diluents include, but are not limited to, carbon (e.g., carbon black for negative electrodes and carbon black, flake graphite and the like for positive electrodes), metal, metal nitrides, metal carbides, metal suicides, and metal borides. Representative electrically conductive carbon diluents include carbon blacks such as Super P and Super S carbon blacks (both from MMM Carbon, Belgium), Shawanigan Black (Chevron Chemical Co., Houston, Tex.), acetylene black, furnace black, lamp black, graphite, carbon fibers and combinations thereof.

Useful electrode compositions can also include graphite acting as an active material. Graphites are active negative electrode materials and are furthermore useful in decreasing the porosity of the electrode during the calendering process. Examples of useful graphites are MAG-E (Hitachi Chemical Co. Ltd., Tokyo, Japan) and SLP30 and SFG-44 (both from TIMCAL Ltd., Bodio, Switzerland).

Useful electrode compositions can include an adhesion promoter that promotes adhesion of the powdered material or electrically conductive diluent to the binder.

Useful electrode compositions can include a surfactant that promotes dispersion of the electrode ingredients in a coating solvent.

To make a negative electrode, the negative electrode composition, optionally containing coating viscosity modifiers such as carboxymethylcellulose and other additives known by those skilled in the art, is mixed in a suitable coating solvent such as water, ethanol, methanol, isopropanol, n-propanol or N-methylpyrrolidinone to form a coating dispersion or coating mixture. The dispersion is mixed thoroughly and then applied to the metal foil current collector by any appropriate dispersion coating technique (e.g., knife coating, notched bar coating, slot-die coating, dip coating, spray coating, electrospray coating, or gravure coating).

The current collectors are typically thin foils of conductive metals such as, for example, copper, stainless steel, or nickel foil. After the slurry is coated onto the current collector foil, it is allowed to dry followed usually by drying in a heated oven, typically set at about 80° C. to about 300° C., for about an hour to remove solvent. The negative electrode can be compressed by pressing between two plates or rollers, as known by those skilled in the art. The electrode may also be provided with a raised pattern as disclosed in U.S. Pat. Appln. Publ. 2008/0248386 A1 (Obrovac et al.).

Positive electrodes can be formed in similar manner to the negative electrode, for example, from a positive electrode composition coated on an aluminum current collector. Exemplary positive electrode compositions may include a polymeric binder and lithium transition metal oxides such as $LiV_3O_8$, $LiV_2O_5$, $LiCo_{0.2}Ni_{0.8}O_2$, $LiNiO_2$, $LiFePO_4$, $LiMnPO_4$, $LiCoPO_4$, $LiMn_2O_4$, $LiCoO_2$; compositions that include mixed metal oxides (e.g., two or three of cobalt, manganese, and nickel).

The positive electrode and negative electrode are combined with an electrolyte to form a lithium ion battery. Methods of fabricating a lithium ion battery will be well known to one of ordinary skill in the battery art. In the battery, the electrolyte is in contact with both the positive electrode composition and the negative electrode composition, and the positive electrode and the negative electrode are not in physical contact with each other; typically, they are separated by a polymeric separator film sandwiched between the electrodes.

The electrolyte may be liquid, solid, or a gel. Examples of solid electrolytes include polymeric electrolytes such as polyethylene oxide, polytetrafluoroethylene, fluorine-containing copolymers, and combinations thereof. Examples of liquid electrolytes include ethylene carbonate, 1-fluoroethylene carbonate, diethyl carbonate, dimethyl carbonate, ethyl methyl carbonate, vinyl carbonate, propylene carbonate, and combinations thereof. The electrolyte is provided with a lithium electrolyte salt. Examples of suitable lithium electrolyte salts include $LiPF_6$, $LiBF_4$, $LiClO_4$, lithium bis(oxalato)borate, $LiN(CF_3SO_2)_2$, $LiN(C_2F_5SO_2)_2$, $LiAsF_6$, $LiC(CF_3SO_2)_3$, and combinations thereof.

Objects and advantages of this disclosure are further illustrated by the following non-limiting examples, but the particular materials and amounts thereof recited in these examples, as well as other conditions and details, should not be construed to unduly limit this disclosure.

EXAMPLES

Unless otherwise noted, all parts, percentages, ratios, etc. in the Examples and the rest of the specification are by weight.

The following abbreviations are used throughout the Examples.

| ABBREVIATION | DESCRIPTION |
|---|---|
| DEC | Diethyl carbonate from Ferro Corp., Zachary, LA |
| EC | Ethylene carbonate from Ferro Corp. |
| Fe1 | Iron pieces having irregular shape with a size 12 millimeters or less, 99.97 percent pure, available from Alfa Aesar, Ward Hill, MA. |
| FEC | Fluoroethylene carbonate from Fujian Chuangxin Science and Develops Co., LTD, Fujian, China |
| FerroSi50 | Ferrosilicon containing 47.92 weight percent silicon and 51.35 weight percent iron available from Globe Metallurgical, Inc., Beverly, OH. Crushed and sized to less than 500 micrometers. |
| FerroSi75 | Ferrosilicon containing 73.53 weight percent silicon and 24.88 weight percent iron available from Globe Metallurgical, Inc. Crushed and sized to less than 500 micrometers. |
| Graphite1 | A graphite powder available as TIMREX SFG44 from TIMCAL Ltd., Bodio, Switzerland. |
| LiOH-20 | A 20 weight percent solution of lithium hydroxide in water, prepared from LiOH-$H_2$O and deionized water. |
| LiOH-$H_2$O | Lithium hydroxide monohydrate, 98+ percent, A.C.S. Reagent available from Sigma-Aldrich Co, St. Louis, MO. |
| lithium stearate | Lithium Stearate, powder, available from Sigma-Aldrich Co, St. Louis, MO. |
| Mm | Misch metal |
| Mm1 | Misch metal, 99.0 percent rare earth metal, typically about 50 percent Ce, 18 percent Nd, 6 percent Pr, 22 percent La: 4 percent other available from Alfa Aesar. |
| PAA-34 | A Polyacrylic acid solution having a weight average molecular weight of 250,000 grams/mole, available as a 34 weight percent solution in water from Sigma-Aldrich Co. |
| PAA-Li | A 10 weight percent polyacrylic acid - lithium salt solution in water prepared by titrating PAA-34 with LiOH-20 until fully neutralized and adding deionized water to obtain the desired 10 weight percent concentration. |
| Si1 | Silicon pieces with a size of 10 cm or less, 98.4 percent pure, available from Alfa Aesar. |
| SiFeTi1 | An alloy powder prepared by melting pure components which contained 66.4 moles silicon, 11.2 moles iron and 11.2 moles titanium available from Sophisticated Alloys Inc., Butler, PA. |
| Sn1 | 325 mesh tin powder, 99.8 percent pure, available from Alfa Aesar. |
| Sn2 | Tin shot, 8-20 mesh, 99.8 percent pure available from Alfa Aesar. |
| stearic acid | Stearic acid, powder, 95 percent pure, Reagent Grade, available from Sigma-Aldrich Co. |
| Ti1 | 325 mesh titanium powder, 99.5 percent pure, available from Alfa Aesar. |

X-Ray Measurement

X-ray diffraction patterns were collected using a Siemens Model KRISTALLOFLEX 805 D500 diffractometer equipped with a copper target x-ray tube and a diffracted beam monochromator. The X-ray diffraction patterns were collected using scattering angles between 20 and 60 degrees [two-theta] stepped at 0.05 degrees [two-theta]. The crystalline domain size was calculated from the width of x-ray diffraction peaks using the Scherrer equation.

Comparative Example A

SiFeTi1 alloy powder (957.444 g) and 42.556 g of Graphite1 were added to the 20-liter chamber of a mill (Simoloyer, model CM20-201 m available from Zoz GmbH, Maltoz-Strasse, Wenden, Germany). Chromium steel balls, 25 kg, having a diameter of 0.476 cm (0.1875 inch) were added to the chamber. Milling was conducted in an argon atmosphere at a chamber rotation of 650 revolutions per minute (rpm) for 1 hour. This process is considered to be a high energy ball milling process. After milling, a Si/Fe/Ti/C alloy powder containing about 66.4 mole percent Silicon, 11.2 mole percent iron, 11.2 mole percent titanium and 11.2 mole percent carbon was produced, Powder A.

The X-ray diffraction patterns of the starting materials contained peaks characteristic of graphite, crystalline Si, crystalline $FeSi_2$ and crystalline $FeTiSi_2$. The X-ray diffraction pattern of Powder A contained peaks characteristic of nanocrystalline $FeTiSi_2$ and nanocrystalline Si. The grain size of the $FeTiSi_2$ and Si crystallites was determined to be about 12 nm and 19 nm, respectively Example 1

SiFeTi1 alloy powder (95.94 g) and 4.26 g of Graphite1 were placed in the 5-liter, steel chamber of a steel pebble mill (Model 611, Jar size 1 available from U.S. Stoneware, Youngstown, Ohio). The chamber was cylindrical in shape with an internal diameter of about 18.8 cm (7.4 inch) and a length of about 17.1 cm (6.75 inch). In addition to the large grain alloy powder, 10 kg of 1.27 cm (0.5 inch) diameter chromium steel balls, one cylindrical steel bar 23.2 cm (9.125 inch) length× 1.27 cm (0.5 inch) diameter and two cylindrical steel bars 21.5 cm (8.625 inch) length×1.27 cm (0.5 inch) diameter were added to the chamber. The chamber was purged with $N_2$ and milling was conducted at 85 rpm (revolutions per minute) for 6 days. After milling, a Si/Fe/Ti/C alloy powder containing about 66.4 mole percent Silicon, 11.2 mole percent iron, 11.2 mole percent titanium and 11.2 mole percent carbon was produced, Powder 1. The above milling process was considered to be a low energy ball milling process (LEBM). The process will be referred to in other examples.

The X-ray diffraction pattern of Powder 1 showed peaks characteristic of nanostructured $FeTiSi_2$ with a grain size of about 9 nm. The X-ray pattern of Powder 1 did not show peaks characteristic of Si, indicating that the Si phase in Powder 1 was amorphous.

Example 2

Large grain SiFe alloy was prepared by arc melting 120.277 grams (g) of Si1 and 79.723 g of Fe1. The $Si_{75}Fe_{25}$ alloy ingot, containing about 75 mole percent silicon and 25 mole percent iron, was crushed and sized to less than 150 micrometers and milled according to the procedure described in Example 1. After milling, a Si/Fe alloy powder containing about 75 mole percent silicon and 25 mole percent iron was produced, Powder 2. The X-ray diffraction pattern of the starting $Si_{75}Fe_{25}$ alloy ingot showed peaks characteristic of crystalline Si and $FeSi_2$ phases. The X-ray diffraction pattern of Powder 2 showed peaks characteristic of nanocrystalline $FeSi_2$ with a grain size less than 50 nm. The X-ray diffraction pattern of Powder 2 did not contain peaks from Si, indicating that the Si phase in Powder 2 was amorphous.

Example 3

Large grain $Si_{69}Fe_{22}Sn_6Mm_3$ was made by arc melting of 90.155 g Si1, 57.159 g of Fe1, 33.130 g of Sn2 and 19.556 g of Mm1. The alloy ingot was crushed and sized to less than 500 micrometers. The resulting powder (90 g) was milled using procedure described in Example 1, resulting in a Si/Fe/Sn/Mm alloy powder containing about 69 mole percent silicon, 22 mole percent iron, 6 mole percent tin and 3 mole percent Mm was produced, Powder 3. The X-ray diffraction pattern of the alloy ingot starting material showed peaks characteristic of crystalline Si, crystalline Sn and crystalline CeSi$_2$ phases. The X-ray diffraction pattern of Powder 3 showed peaks characteristic of nanocrystalline CeSi$_2$ with a grain size less than 50 nm. The X-ray diffraction pattern of Powder 3 did not contain peaks from Si or Sn, indicating that these phases were amorphous.

Example 4

Large grain Si$_{75}$Fe$_{20}$ was made by arc melting of 130.70 g of Si1 and 69.30 g of Fe1. The alloy ingot was crushed and sized to less than 150 micrometers. The resulting powder (98.27 g) and 1.73 g of Graphite 1 were milled simultaneously using the procedure described in Example 1, resulting in a Si/Fe/C alloy powder containing about 75 mole percent silicon, 20 mole percent iron and 5 mole percent carbon, Powder 4. The X-ray diffraction pattern of the starting alloy ingot contained peaks characteristic of crystalline Si and FeSi$_2$ phases. The X-ray diffraction pattern of Powder 4 contained peaks characteristic of nanocrystalline FeSi$_2$ with a grain size less than 50 nm. From stoichiometry, this alloy also contained Si and SiC phases, however, the X-ray diffraction pattern of Powder 4 did not contain peaks from Si or SiC, indicating that these phases were amorphous.

Example 5

Large grain Si$_{71}$Fe$_{23}$ was made by arc melting of 121.64 g Si1 and 78.38 g of Fe1. Large grain size Sn$_2$Fe was made by arc melting of 242.86 g Sn2 and 57.14 g of Fe1. The Sn$_2$Fe ingot was then annealed at 490° C. in argon for 48 hours. The alloy ingots were crushed and sized to less than 500 micrometers. Si$_{71}$Fe$_{23}$ (110.27 g) and 19.73 g Sn$_2$Fe were milled simultaneously using procedure described in Example 1, resulting in a Si/Fe/Sn alloy powder containing about 71 mole percent silicon, 25 mole percent iron and 4 mole percent tin, Powder 5. The X-ray diffraction pattern of the starting Si$_{71}$Fe$_{23}$ alloy ingot contains peaks characteristic of crystalline Si and FeSi$_2$ phases. The X-ray diffraction pattern of the starting Sn$_2$Fe alloy ingot contains peaks characteristic of crystalline Sn and Sn$_2$Fe phases. The X-ray diffraction pattern of Powder 5 contained peaks characteristic of nanocrystalline FeSi$_2$ with a grain size less than 50 nm. The X-ray diffraction pattern of Powder 5 did not contain peaks from Si or Sn, indicating that these phases were amorphous.

Comparative Example B

The procedure of Example 5 was repeated, except the vessel was rotated at 10 rpm instead of 85 rpm, and the milling time was 12 days instead of 6 days, resulting in a Si/Fe/Sn alloy powder containing 71 mole percent silicon, 25 mole percent iron, and 4 mole percent tin, Powder B. The X-ray diffraction pattern of the starting Si$_{71}$ Fe$_{23}$ alloy ingot contained peaks characteristic of crystalline Si and FeSi$_2$ phases. The X-ray diffraction pattern of the starting Sn$_2$Fe alloy ingot contained peaks characteristic of crystalline Sn and Sn$_2$Fe phases. The X-ray diffraction pattern of Powder B contained peaks from Si and Sn, indicating that these phases were crystalline with the grain size of 195 nm for Si phase and 58 nm for Sn phase. This was in contrast to Powder 5 (see Example 5) where both Si and Sn phase were amorphous.

Example 6

FerroSi75 (46.21 g), 69.06 g of FerroSi50, and 15.97 g of Sn1 were milled using the procedure described in Example 1 resulting in a Si/Fe/Sn alloy powder containing about 71 mole percent silicon, 25 mole percent iron and 4 mole percent tin, Powder 6. The X-ray diffraction pattern of Powder 6 showed peaks characteristic of nanocrystalline FeSi$_2$ with a grain size less than 50 nm. The X-ray diffraction pattern of Powder 6 did not contain peaks from Si and Sn, indicating that the Si and Sn phases in Powder 6 were amorphous.

Example 7

FerroSi75 (64.29 g), 42.77 g of FerroSi50, 16.14 g of Sn1 and 8.14 g of Ti1 were milled using the procedure described in Example 1, except the milling time was 13 days. After milling, a Si/Fe/Sn/Ti alloy powder containing about 71 mole percent silicon, 20 mole percent iron, 4 percent tin and 5 percent titanium was obtained, Powder 7. The X-ray diffraction pattern of Powder 7 showed peaks characteristic of nanocrystalline FeSi$_2$ with a grain size less than 50 nm. The X-ray diffraction pattern of Powder 7 did not contain peaks from Si, Sn and TiSi$_2$ (and/or FeTiSi$_2$), indicating that the Si, Sn and TiSi$_2$ (and/or FeTiSi$_2$) phases were amorphous.

Procedure for Preparing an Alloy Electrode, Cell Assembly and Cell Testing

Alloy powder (1.84 g) and 1.6 g of PAA-Li were mixed in a 45-milliliter stainless steel vessel using four, 1.27 cm (0.5 inch) tungsten carbide balls. The mixing was done in a Planetary Micro Mill Pulverisette 7 from Fritsch, Germany at speed 2 for one hour. The resulting solution was hand spread onto a 10-micrometer thick Cu foil using a gap die (typically 3 mil gap). The sample was then dried in a vacuum oven at 120° C. for 1-2 hours producing an alloy electrode film. Circles, 16 mm in diameter, were then punched out of the alloy electrode film and were used as an electrode for a cell (below).

Half coin cells were prepared using 2325 button cells. All of the components were dried prior to assembly and the cell preparations were done in a dry room with a −70° C. dew point. The cells were constructed from the following components and in the following order, from the bottom up: cell bottom/Cu Spacer/Li metal film/cell grommet/Separator/alloy electrode/Cu spacer/cell top. Each cell consisted of 2325 button cell hardware, a 20 millimeter (mm) diameter×0.762 mm (30 mil) thick disk of Cu spacer, a 16 mm diameter disk of alloy electrode, a 20 mm diameter micro porous separators (CELGARD 2400p available from Separation Products, Hoechst Celanese Corp., Charlotte, N.C.), 18 mm diameter× 0.38 mm thick disk of Li metal film (lithium ribbon available from Aldrich Chemical Co., Milwaukee, Wis.) and a 20 mm diameter×0.762 mm (30 mil) disk of copper spacer. The electrolyte was a solution containing 90 weight percent of an EC/DEC solution (2/1 by volume) and 10 weight percent FEC with LiPF$_6$ used as the conducting salt at a 1 M concentration. Prior to adding the LiPF$_6$, the solvent solution was dried over molecular sieve (3A type) for 12 hours. The cell was filled with 100 microliters of electrolyte solution. The cell was crimp-sealed prior to testing.

Cells were cycled from 0.005V to 0.90V at specific rate of 100 mA/g-alloy with trickle down to 10 mA/g at the end of discharge (lithiation of the alloy) for the first cycle. From then on, cells were cycled in the same voltage range but at 200 mA/g-alloy and trickle down to 20 mA/g-alloy at the end of discharge. Cells were allowed 15 min rest at open circuit at the end of every half cycle.

Example 8

An alloy electrode film and three coin cells were prepared and tested according to the Procedure for Preparing an Alloy Electrode, Cell Assembly and Cell Testing using Powder 1. Results are reported Table 1.

Example 9

An alloy electrode film and three coin cells were prepared and tested according to the Procedure for Preparing an Alloy Electrode, Cell Assembly and Cell Testing using Powder 2. Results are reported Table 1.

Example 10

An alloy electrode film and three coin cells were prepared and tested according to the Procedure for Preparing an Alloy Electrode, Cell Assembly and Cell Testing using Powder 4. Results are reported Table 1.

Example 11

An alloy electrode film and three coin cells were prepared and tested according to the Procedure for Preparing an Alloy Electrode, Cell Assembly and Cell Testing using Powder 5. Results are reported Table 1.

Example 12

An alloy electrode film and three coin cells were prepared and tested according to the Procedure for Preparing an Alloy Electrode, Cell Assembly and Cell Testing using Powder 6. Results are reported Table 1.

Example 13

An alloy electrode film and three coin cells were prepared and tested according to the Procedure for Preparing an Alloy Electrode, Cell Assembly and Cell Testing using Powder 7. Results are reported Table 1.

Example 14

FerroSi75 (261.24 g), 390.47 g of FerroSi50, 90.29 g of Sn1 and 2.23 g stearic acid (as milling aid) were placed in the chamber of a ceramic pebble mill (3.9-Gal Porcelain Jar available from Paul Abbe, Bensenville, Ill.). The chamber was cylindrical in shape with an internal diameter of 30.5 cm (12 inches) and a length of about 25.4 cm (10 inches). In addition to the large grain alloy powder and the stearic acid, 37.1 kg of 1.27-cm (0.5-inch) diameter chromium steel balls were added to the chamber. The chamber was purged with $N_2$ and milling was conducted at 77 rpm (revolutions per minute) for 120 hours. After milling, a Si/Sn/Fe alloy powder containing about 71 mole percent silicon, 4 mole percent tin, and 25 mole percent iron was produced, Powder 14.

The X-ray diffraction pattern of Powder 14 showed peaks characteristic of nanocrystalline $FeSi_2$ with a grain size less than 50 nm. The X-ray diffraction pattern of Powder 14 did not contain peaks from Si and Sn, indicating that the Si and Sn phases in Powder 14 were amorphous.

Example 15

The procedure of Example 14 was repeated, except using 0.742 g lithium stearate (as milling aid) instead of stearic acid, and the milling time was 140 hours (instead of 120 hours). After milling, a Si/Sn/Fe alloy powder containing about 71 mole percent silicon, 4 mole percent tin, and 25 mole percent iron was produced, Powder 15.

The X-ray diffraction pattern of Powder 15 showed peaks characteristic of nanocrystalline $FeSi_2$ with a grain size less than 50 nm. The X-ray diffraction pattern of Powder 15 did not contain peaks from Si and Sn, indicating that the Si and Sn phases in Powder 15 were amorphous.

Example 16

FerroSi75 (3.838 kg), 5.736 kg of FerroSi50, 1.326 kg of Sn1 and 0.109 kg stearic acid (as milling aid) were placed in the chamber of a ceramic lined pebble mill (60-Gal Ceramic lined Pebble Mill, Model 8B, available from Paul Abbe, Bensenville, Ill.). The chamber was cylindrical in shape with an internal diameter of 73.7 cm (29 inch). In addition to the large grain alloy powder and the stearic acid, 545 kg of 1.27-cm (0.5-inch) diameter chromium steel balls were added to the chamber. The chamber was purged with $N_2$ prior to sealing and milling was conducted at 48 rpm for 96 hours. The mill was cooled by flowing tap water through the mill's double wall during the milling. After milling, a Si/Sn/Fe alloy powder containing about 71 mole percent silicon, 4 mole percent tin, and 25 mole percent iron was produced, Powder 16.

The X-ray diffraction pattern of Powder 16 showed peaks characteristic of nanocrystalline $FeSi_2$ with a grain size less than 50 nm and a new $FeSi_2$ phase (low temperature phase) with a grain size less than 50 nm. The X-ray diffraction pattern of Powder 16 did not contain peaks from Si and Sn, indicating that the Si and Sn phases in Powder 16 were amorphous.

Example 17

An alloy electrode film and three coin cells were prepared and tested according to the Procedure for Preparing an Alloy Electrode, Cell Assembly and Cell Testing using Powder 14. Results are reported Table 1.

Example 18

An alloy electrode film and three coin cells were prepared and tested according to the Procedure for Preparing an Alloy Electrode, Cell Assembly and Cell Testing using Powder 15. Results are reported Table 1 (below).

TABLE 1

| Example | Initial Capacity Loss, percent | Capacity at Cycle 2 mAh/g | Capacity at Cycle 50, mAh/g | Efficiency, percent |
| --- | --- | --- | --- | --- |
| 8 | 24 | 855 | 785 | 92 |
| 9 | 16 | 658 | 625 | 95 |
| 10 | 17 | 1003 | 924 | 92 |
| 11 | 10 | 682 | 656 | 96 |
| 12 | 13 | 818 | 763 | 93 |
| 13 | 14 | 875 | 865 | 99 |
| 17 | 10.3 | 823 | 775 | 94 |
| 18 | 10.6 | 906 | 864 | 95 |

In Table 1 (above), Efficiency = Capacity at Cycle 50/Capacity at Cycle 2.

Table 1 shows that alloy powders prepared above, when fabricated into an electrode and further fabricated into a cell, exhibited stable capacity for many cycles, making them suitable for use as active anode materials in battery applications including rechargeable lithium ion battery applications.

All patents and publications referred to herein are hereby incorporated by reference in their entirety. All examples given herein are to be considered non-limiting unless otherwise indicated. Various modifications and alterations of this disclosure may be made by those skilled in the art without departing from the scope and spirit of this disclosure, and it should be understood that this disclosure is not to be unduly limited to the illustrative embodiments set forth herein.

What is claimed is:

1. A method of making nanostructured alloy particles, the method comprising: providing a millbase comprising: (i) silicon, and (ii) at least one of carbon or a transition metal; milling the millbase in a pebble mill containing milling media to provide the nanostructured alloy particles, wherein the nanostructured alloy particles are substantially free of crystalline domains greater than 50 nanometers in size and wherein the pebble mill has a theoretical critical speed and wherein the pebble mill has a rotational speed in a range of from 50 to 120 percent of the theoretical critical speed.

2. The method of claim 1, wherein a volume ratio of the milling media to the millbase is greater than 5:1.

3. The method of claim 1, wherein the nanostructured alloy particles are amorphous.

4. The method of claim 1, wherein a volume ratio of the pebble mill to the milling media and the millbase combined is 2:1 or less.

5. The method of claim 1, wherein the milling media have a maximum impact energy in a range of from 0.01 to 0.3 joules.

6. The method of claim 1, wherein the pebble mill has a containment wall having a temperature, and wherein the temperature is maintained at or below 100 degrees Celsius.

7. The method of claim 1, wherein the nanostructured alloy particles comprise silicon, tin, and a transition metal.

8. The method of claim 1, wherein the millbase comprises ferrosilicon.

9. The method of claim 1, wherein (ii) comprises carbon.

10. The method of claim 1, wherein the pebble mill has a ceramic containment wall.

11. The method of claim 1, the pebble mill further contains a milling aid comprising a saturated higher fatty acid or a salt thereof.

12. The method of claim 11, wherein the milling aid comprises stearic acid.

13. The method of claim 1, wherein the nanostructured alloy particles are adapted for use as an active material in a negative electrode composition in a lithium ion battery.

14. A method of making a negative electrode composition for a lithium ion battery, the method comprising:
   (a) making nanostructured alloy particles by a method comprising providing a millbase comprising:
      (i) silicon; and
      (ii) at least one of carbon or a transition metal;
   and milling said millbase in a pebble mill containing milling media, wherein the nanostructured alloy particles are substantially free of crystalline domains greater than 50 nanometers in size; wherein the pebble mill has a theoretical critical speed and wherein the pebble mill has a rotational speed in a range of from 50 to 120 percent of the theoretical critical speed; and
   (b) dispersing the nanostructured alloy particles in a polymeric binder to provide the negative electrode composition.

15. The method of claim 14, wherein the nanostructured alloy particles are amorphous.

16. The method of claim 14, wherein the nanostructured alloy particles comprise silicon, tin, and a transition metal.

17. The method of claim 14, wherein the nanostructured alloy particles comprise silicon, tin, and iron.

18. The method of claim 14, wherein the nanostructured alloy particles contain carbon.

19. The method of claim 14, wherein the pebble mill has a ceramic containment wall.

20. The method of claim 14, the pebble mill further contains a milling aid comprising a saturated higher fatty acid or a salt thereof.

21. The method of claim 20, wherein the milling aid comprises stearic acid.

* * * * *